Nov. 7, 1950    T. T. ANNAS    2,529,066
BLOCK MOLDING MACHINE
Filed June 17, 1946    4 Sheets-Sheet 1
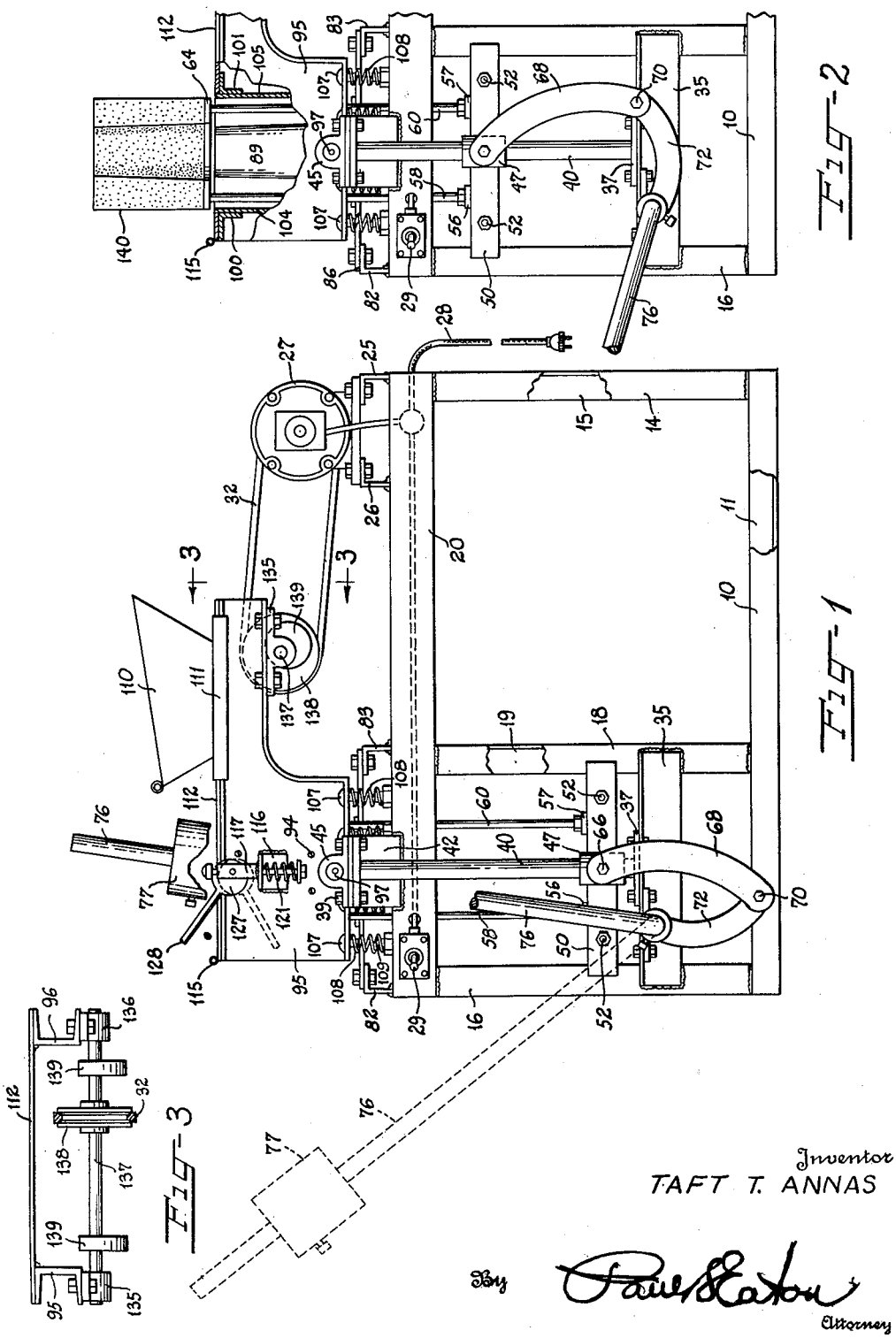
Inventor:
TAFT T. ANNAS
By Paul S. Eaton
Attorney

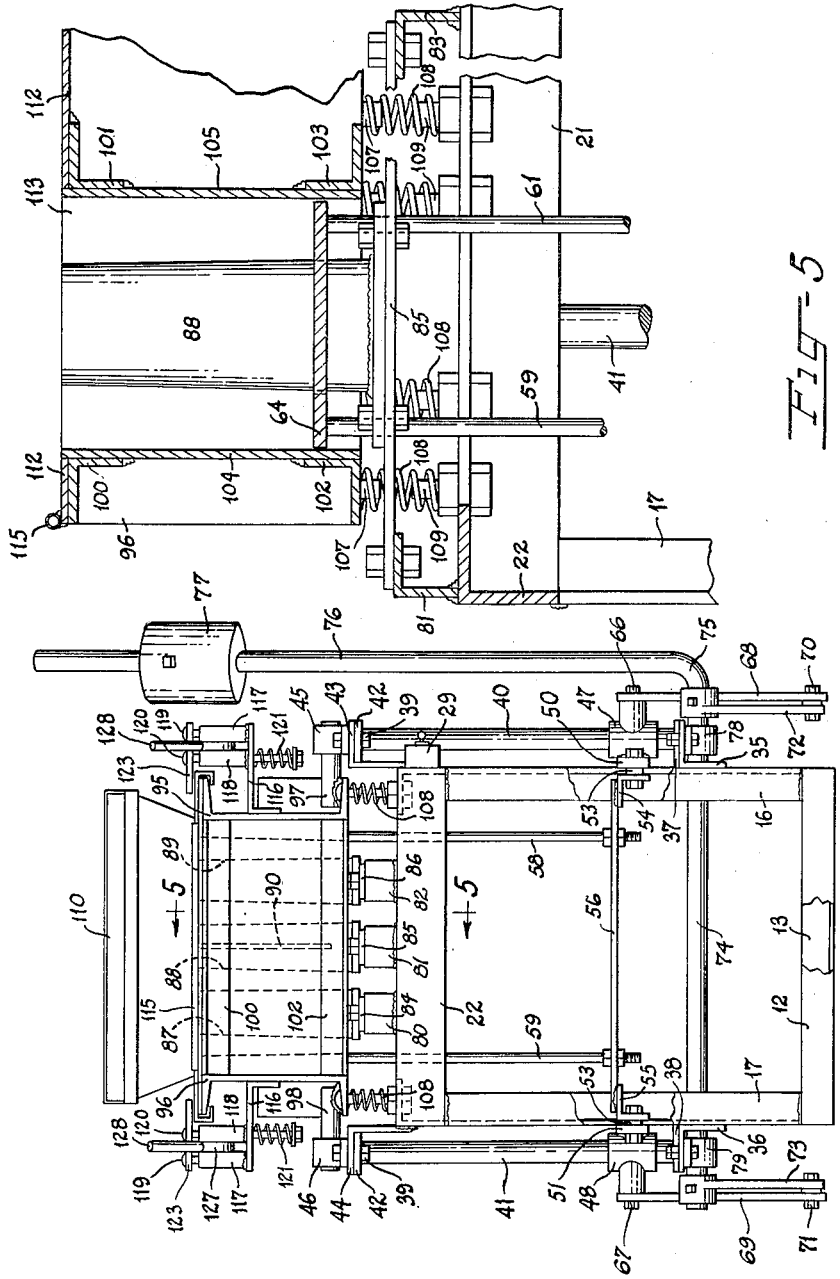

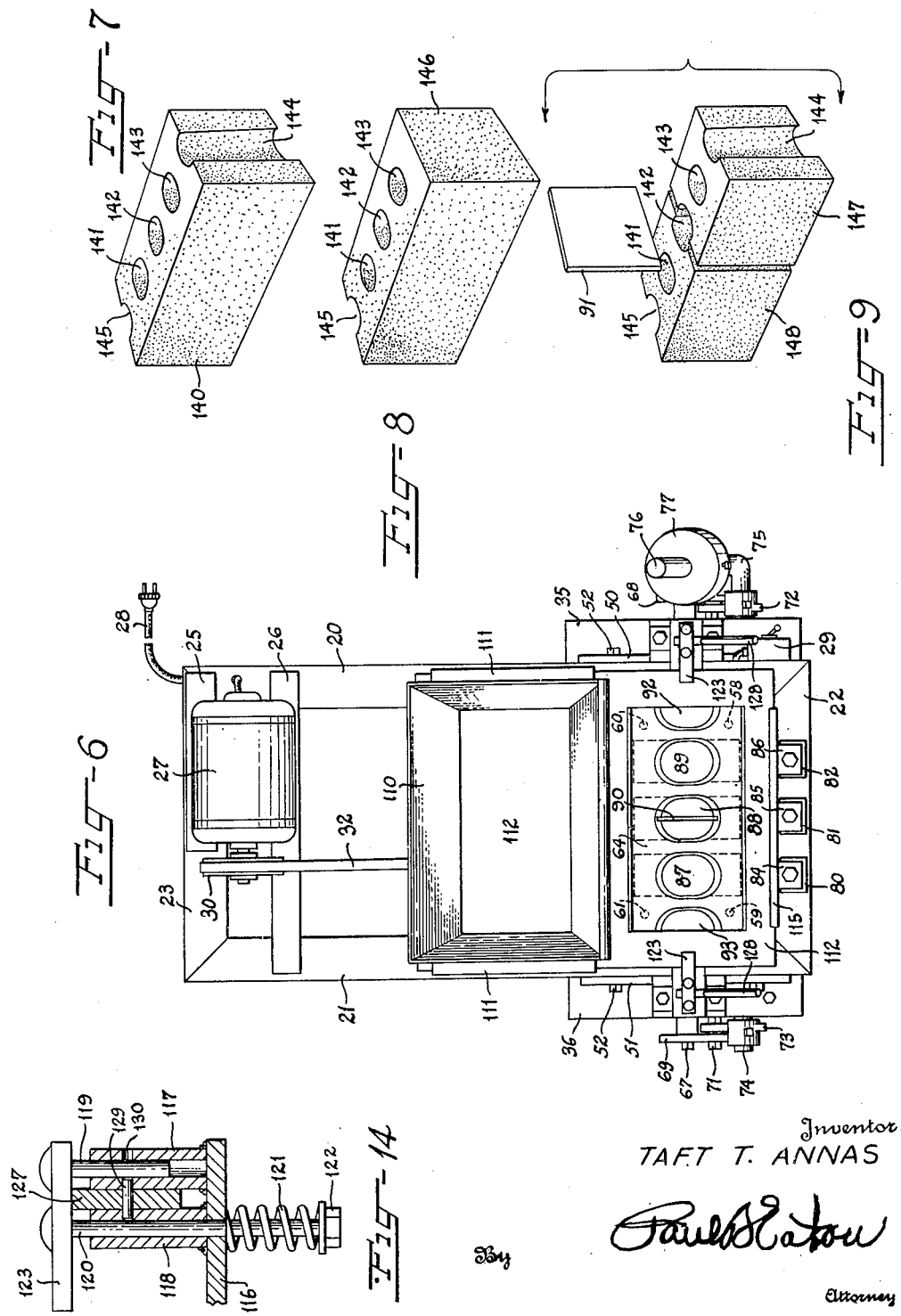

Nov. 7, 1950 T. T. ANNAS 2,529,066
BLOCK MOLDING MACHINE
Filed June 17, 1946 4 Sheets-Sheet 4
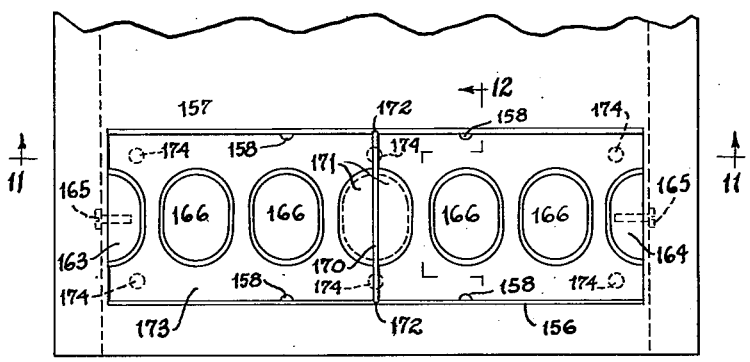
Fig-10
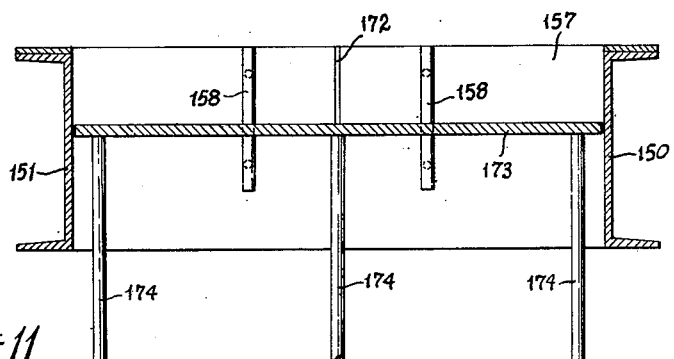
Fig-11
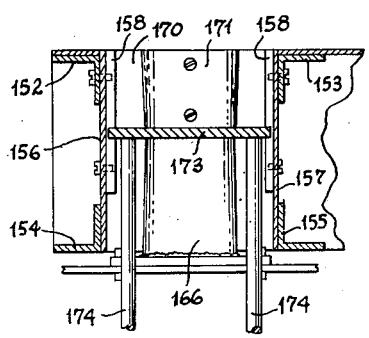
Fig-12
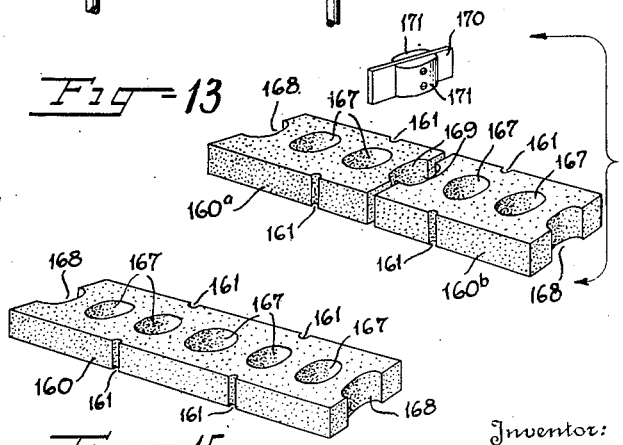
Fig-13
Fig-15
Inventor:
TAFT T. ANNAS
By Paul S. Eaton
Attorney Patented Nov. 7, 1950

2,529,066

UNITED STATES PATENT OFFICE 2,529,066

BLOCK MOLDING MACHINE

Taft T. Annas, Hickory, N. C.

Application June 17, 1946, Serial No. 677,331

2 Claims. (Cl. 25—41)

1

This invention relates to a concrete block making machine, and although it is especially adapted for the making of concrete building blocks, it is to be understood that it can be used for making all kinds of moldable blocks from a moldable material, such as the making of bricks, the making of plastic articles, and the like.

It is an object of this invention to provide a block making machine having a slidable hopper, which is adapted to be slid over the compartment in which the blocks are molded and which hopper can be slidably moved from over the completed block. The machine is also provided with means for imparting vibration to the hopper and to the mechanism forming the molding chamber so as to cause the material being molded to be tightly packed into the mold and thus making a block, which is less liable to have open spaces therein, due to the material not being shaken down into the mold.

It is another object of this invention to provide a concrete block making machine having a mold into which moldable material can be placed for forming a block, together with means for sliding a hopper over the mold for guiding the material into the mold and having means for clamping the hopper in position, and also having means for imparting vibration to the hopper and to the mold to cause a better settling of the material in the mold, while the block is being formed, together with means for ejecting the block out of the mold, when the molding operation has been completed.

Some of the objects of the invention having been stated, other objects will appear as the description proceeds, when taken in connection with the accompanying drawings, in which:

Figure 1 is a side elevation of the machine and showing the parts in position ready for the making of a block, when the hopper is slid over the mold, it also shows the position of parts, after the completion of a block and before the same is ejected;

Figure 2 is a view similar to the left hand portion of Figure 1, but showing the parts in the position they will occupy when a block has been ejected from the mold;

Figure 3 is a view mostly in elevation and partly in section and taken along the line 3—3 in Figure 1;

Figure 4 is an end view of the apparatus looking from the left hand end of Figure 1;

Figure 5 is a vertical sectional view on an enlarged scale and taken along the line 5—5 in Figure 4;

2

Figure 6 is a top plan view of the machine;

Figure 7 is an isometric view of one form of block which can be made with this machine;

Figure 8 is an isometric view of another form of block which can be made in this machine;

Figure 9 is an isometric view of another form of block which can be made in this machine;

Figure 10 is a top plan view of the mold end of the machine, and showing the machine of greater width than it is shown in Figure 6, and whereby a larger block can be formed, or two blocks can be formed at one time;

Figure 11 is a vertical sectional view taken along the line 11—11 in Figure 10;

Figure 12 is a vertical sectional view taken along the line 12—12 in Figure 10;

Figure 13 is an exploded isometric view of a form of block which can be made in the type of mold shown in Figures 10, 11 and 12;

Figure 14 is a detail view mostly in section showing a portion of one of the clamping means for clamping the hopper in position over the mold;

Figure 15 is an isometric view of a building block similar to Figure 13, but showing it made all in one piece and not in half lengths.

Referring more specifically to the drawings, the numerals 10 and 11 indicate two side angle iron members forming a part of the bottom frame, which also has a front angle bar 12 and a rear angle bar 13, all welded together to form a rectangular frame, which rests on the floor. Rising upwardly from this rectangular frame comprising bars 10 to 13 inclusive are two rear corner posts 14 and 15 and front corner posts 16 and 17, and intermediate uprights 18 and 19. Welded to the upper ends of all of these uprising posts 14 to 19 inclusive is a rectangular frame comprising side angle bars 20 and 21, and end angle bars 22 and 23. Welded to the upper surface of the upper rectangular frame is a pair of angle irons 25 and 26 forming a motor mount for an electric motor 27, which derives its energy from a suitable conduit or drop cord 28, one wire of which is led through a toggle switch 29 before it is led to the motor. This toggle switch is within easy reach of the operator of the machine. This electric motor has a V-pulley 30 mounted on its motor shaft on which a V-belt 32 is mounted for imparting oscillation to the hopper as will be presently described.

Welded to the uprights 16 and 18 is a horizontally disposed angle bar 35 and welded to uprights 17 and 19 is another angle bar 36. These angle bars 35 and 36 have bolted to their upper surfaces flanged members 37 and 38 to which are secured the lower edges of guide rods 40 and 41. The upper ends of these guide rods 40 and 41 are flanged as at 42 and are bolted to angle irons 43 and 44 by means of bolts 39, which bolts also penetrate bearings 45 and 46. Slidably mounted on the bars 40 and 41 are cuff members 47 and 48 to the proximate surfaces of which are welded bars 50 and 51 to which are bolted, by means of bolts 52, angle bars 54 and 55 which have spacer members 53 therebetween, so that the bars 50 and 54 and 51 and 55 will be separated apart from each other to travel on the two sides of the flanges of the uprising posts 16, 17, 18, and 19.

Welded to the top surface of angle bars 54 and 55 are transverse bars 56 and 57 to which are secured vertically adjustable rods 58, 59, 60 and 61, which project upwardly and are adapted to support a movable bottom or pallet 64 of the mold to be presently described. The cuff members 47 and 48 have pivotally secured thereto as at 66 and 67 links 68 and 69 whose lower ends are pivotally connected as at 70 and 71 to the outer end of the levers 72 and 73 adjustably secured on a transverse shaft 74, which is bent upwardly, as at 75 to provide a lever 76, having a weight 77 adjustably secured thereon. Shaft 74 is mounted in bearings 78 and 79.

Welded to the top of front bar 22 is a plurality of angle brackets 80, 81 and 82 and bolted on top of top side bars 20 and 21 is an angle bar 83. On this bar 83 and on bars 80, 81 and 82 are welded flat bars 84, 85 and 86, and on top of these bars 84, 85 and 86 are bolted the base members of cores 87, 88 and 89 for forming openings in the block being molded.

The center core 88 is slit transversely as evidenced by slot 90 into which a sheet member 91 may be inserted when it is desired to form two blocks in the same mold according to the showing in Figure 9. Half cores 92 and 93 are secured to the end walls of the molds to be presently described by any suitable means, such as screws 94.

The end walls of the mold are formed from two channel irons 95 and 96. These channel members 95 and 96 have welded thereto stud shafts 97 and 98, which are oscillatably mounted in bearings 45 and 46, which have previously been described. Disposed between the channel members 95 and 96 are angle bars 100, 101, 102 and 103, and welded to the interior surfaces of bars 100 and 102 is a plate 104, which forms the front wall of the mold while secured to the interior surfaces of angle bars 101 and 103 is a plate 105 which forms the rear wall of the mold.

The lower angles of channel bars 95 and 96 have a plurality of downwardly projecting portions 107, which project into compression springs 108, and rising from side top angle bars 20 and 21 are upwardly projecting pins 109, which project into the lower ends of the compression springs 108. In this way, the mold mechanism is resiliently supported, but can oscillate on stub shafts 97 and 98, which are oscillatably mounted in the bearings 45 and 46.

A hopper 110 is provided, having its outer edges turned downwardly and inwardly, as at 111, and adapted to slidably fit over the upper horizontal flanges of the channel bars 95 and 96. Disposed on top of the top angles of the channel irons 95 and 96 is a plate 112 which has an opening 113 therein, which is of the same size as the mold defined by walls 104 and 105 and channel members 95 and 96. When the hopper is slid back from over the opening 113, the bottom of the hopper will be closed by the plate 112. At the forward end of plate 112, there is a pipe 115 welded thereacross to limit the forward movement of the hopper 110 and to cause its opening to coincide with opening 113 in plate 112.

For clamping the hopper 110 in position over the opening 113, there has been provided, on each side of the apparatus, supports 116, which are welded to the exterior surfaces of the channel members 95 and 96. These supports 116 have rising upwardly therefrom tubular members 117 and 118, in which bolts 119 and 120 are slidably mounted. Bolts 120 project downwardly through the supports 116 and have disposed therearound a compression spring 121 which is confined thereon by a nut 122 to normally force the bolt 120 downwardly. The bolts 119 and 120 penetrate a strap iron member 123 so that spring 121 normally forces the strap iron members 123 downwardly into clamping contact with the upper horizontal portion of the hopper 110 to hold it in registering position, while the mold is being filled with molding material.

Mounted between the tubular members 117 and 118 is a cam member 127 which has a handle 128 extending therefrom, this cam member being mounted on a pin 129, which is mounted in transverse bores 130 in the tubular members 117 and 118, the pins 129 being inserted in position, then the bolts 119 and 120 drop into the tubular members 117 and 118 to thus confine the pin 129 on which the cam is mounted.

Mounted on the lower surfaces of the rear ends of the channel members 95 and 96 are bearings 135 and 136 in which a shaft 137 is rotatably mounted, and which shaft has fixed thereon a V-pulley 138 on which the V-belt 32 is mounted. This shaft 137 has secured thereon a pair of eccentrics 139, which, when the shaft 137 is rotated, causes a jarring motion to be imparted to the whole assembly secured to channel members 95 and 96, to thus cause the molding material to be settled and packed around the cores within the molding chamber due to the jarring action, on account of the eccentrics 139 being disposed on the shaft 137.

The blocks manufactured from the apparatus shown in Figures 1 to 6 inclusive is indicated at Figure 7, where this block is indicated by reference character 140. The vertical openings through the block indicated by reference characters 141, 142 and 143 are formed by the cores 87, 88 and 89, and the half cores 92 and 93, form the semi-circular cavities 144 and 145 respectively in the two ends of the block. If the half core 92 is omitted, then the block 146 in Figure 8 is the result.

If a plate 91 is inserted in the slot 90, then the blocks 147 and 148 will be the result, as shown in Figure 9. In Figures 10, 11 and 12 a modified form of the mold is shown, which is similar to that described, except that it is longer, that is, the machine is wider. Here are shown channel bars 150 and 151, between which are secured angle bars 152, 153, 154 and 155, and secured to angle bars 152 and 154 is a plate 156, while plate 157 is secured between angle bars 153 and 155. The inner surfaces of plates 156 and 157 may have suitable half round members 158 secured thereto to form border grooves in the exterior of the blocks 160 being made, or in the two halves thereof 160a and 160b. These grooves are indicated by reference character 161. Suitable half cores 163 and 164 are secured to the channel members 150 and 151 by any suitable means, such as screws 165, while suitable oval shaped cores 166 form the openings 167 in the block. The half cores 163 and 164 form the end cavities 168 in each end of the block.

If desired, instead of making full size blocks 160, the central core 166 may be removed and a plate member 170, having half cores 171 secured one on either side and being the same height as the block to be made, can be substituted in place of the core 166, to form two half blocks having semi-circular cavities 169 in the adjoining ends. The plate member 170 is slidably positioned in slots 172 in plates 156 and 157 and rest on a pallet 173. The half cores 171 are tapered from top to bottom and are ejected, along with plate 170, from the mold each time a block is formed and replaced to form the next block. The cores 166 and the half cores 73 and 74 are tapered from bottom to top and remain in position at all times.

The pallet or false bottom is supported by six rods 174, and is raised from the mold on these rods in the same manner as pallet 64 is raised on rods 58, 59, 60 and 61 heretofore described.

In the drawings and specification, there has been set forth a preferred embodiment of the invention, and although specific terms are employed, they are used in a generic and descriptive sense only and not for purposes of limitation, the scope of the invention being defined in the claims.

I claim:

1. A block making machine comprising a first frame, a second frame resiliently mounted on top of the first frame, said second frame having a mold cavity therein serving as a mold and into which plastic material may be poured for forming a block, the first frame having a plurality of cores extending upwardly therefrom into the mold, said mold having a vertically slidable bottom or pallet disposed therein and having openings therein fitting around the cores, the first frame having bearings thereon, stub shafts mounted in the bearings, the said stub shafts being secured to the second frame, a plurality of compression springs disposed between the first and second frames for resiliently supporting the second frame, the second frame having a cantilevered extension extending from the upper half thereof, a rotatable shaft mounted in the endmost portion of the cantilevered extension of the second frame and having eccentric members thereon, means mounted on the main frame and having a flexible driving connection with the rotatable shaft in the cantilevered extension of the second frame for imparting rotation to the shaft to impart vibration to the second frame to cause a settling of material in the mold, a plurality of supports for the pallet or movable bottom, a vertically slidable frame to which the supports are secured, means comprising a lever having a link pivotally secured to one end thereof and a connection between the other end of the link and the vertically slidable frame for moving the vertically slidable frame upwardly to move the movable bottom upwardly to expel the block from the mold, a hopper slidably mounted on top of the second frame, and having an opening therein of approximately the same size as the upper end of the mold, a plate mounted on the upper side of the second frame and having an opening therein coinciding with the upper portion of the mold, means for slidably mounting the hopper on top of the second frame so that it can slide over and cover the upper portion of the mold or slide away to expose the upper portion of the mold, and eccentric means carried by the second frame for clamping the hopper in position over the upper end of the mold while material is being poured thereinto.

2. A block making machine comprising a first frame, a second frame resiliently mounted on top of the first frame, said second frame having a mold cavity therein serving as a mold and into which plastic material may be poured for forming a block, the first frame having a plurality of cores extending upwardly therefrom into the mold, said mold having a vertically slidable bottom or pallet disposed therein and having openings therein fitting around the cores, the first frame having bearings thereon, stub shafts mounted in the bearings, the said stub shafts being secured to the second frame, a plurality of compression springs mounted on the first frame for resiliently supporting the second frame, the second frame having a cantilevered extension extending from the upper half thereof, a rotatable shaft mounted in the endmost portion of the cantilevered extension of the second frame and having eccentric members fixed thereon, driving means mounted on the main frame and having a flexible driving connection with the shaft in the second frame for imparting rotation to the shaft in the second frame to impart vibration to the second frame to cause a settling of material in the mold, a plurality of supports for the pallet or movable bottom, a vertically slidable frame to which the supports are secured, means comprising a lever and a link pivoted to the lever and slidable frame for moving the vertically slidable frame upwardly to move the movable bottom upwardly to expel the block from the mold, a hopper mounted on top of the second frame, and having an opening therein of approximately the same size as the upper end of the mold, a plate mounted on the upper side of the second frame and having an opening therein coinciding with the upper portion of the mold, means for slidably mounting the hopper on top of the second frame and in sliding contact with said plate so that it can slide over and cover the upper portion of the mold or slide away to expose the upper portion of the mold, and means comprising a lever with an eccentric thereon for clamping the hopper in position over the upper end of the mold while material is being poured thereinto, one of the cores being slit transversely and a plate adapted to be inserted in the slit core so that two blocks can be formed at the same time instead of one elongated block.

TAFT T. ANNAS.

REFERENCES CITED

The following references are of record in the file of this patent:

UNITED STATES PATENTS

| Number | Name | Date |
|--------|------|------|
| 804,423 | Miller | Nov. 14, 1905 |
| 2,298,074 | Straub | Oct. 6, 1942 |
| 2,299,724 | Appley | Oct. 27, 1942 |
| 2,389,673 | Lofdahl | Nov. 27, 1945 |
| 2,396,999 | George | Mar. 19, 1946 |